United States Patent Office 3,341,763
Patented Sept. 12, 1967

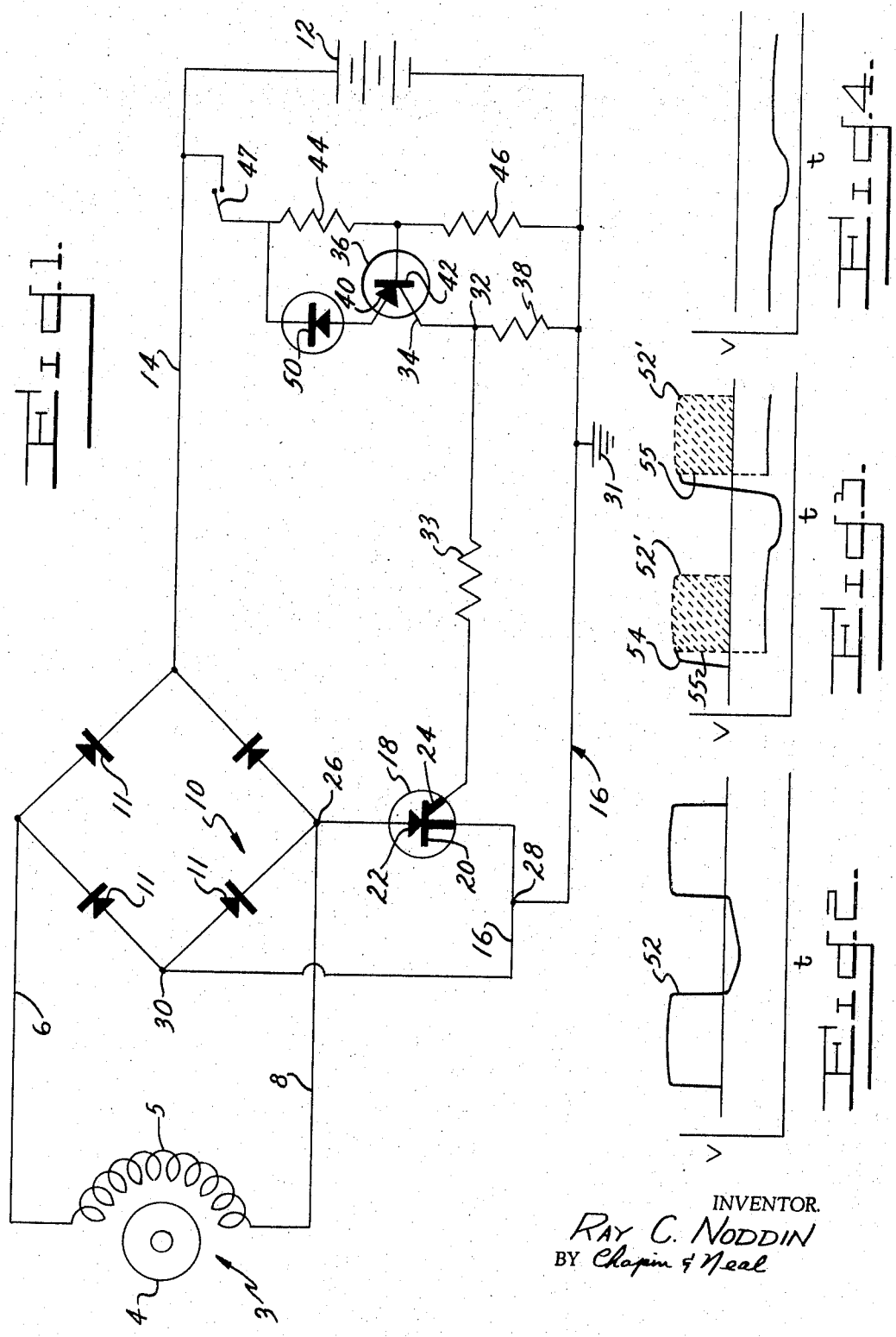

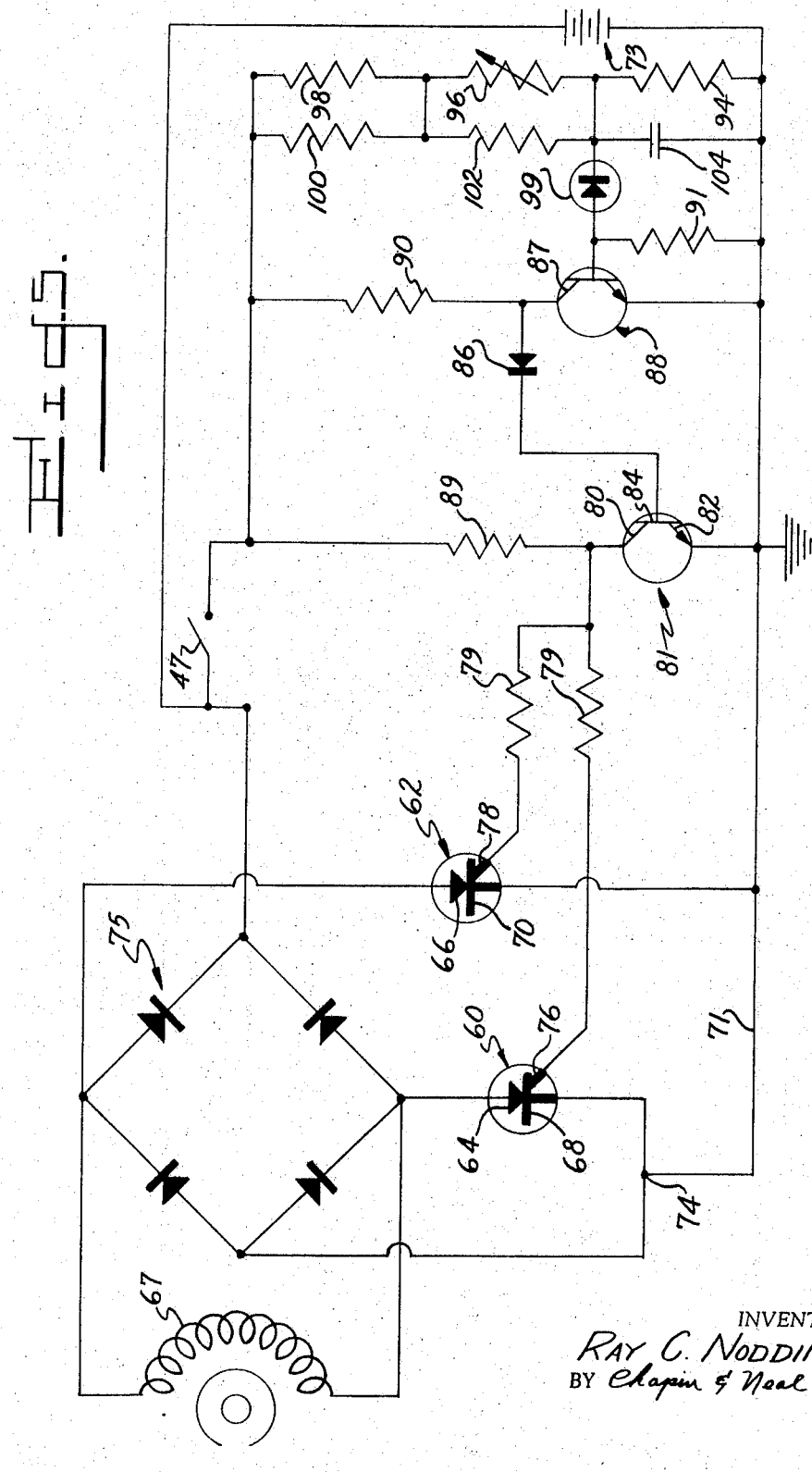

3,341,763
OUTPUT CONTROL FOR PERMANENT MAGNET ALTERNATORS
Ray C. Noddin, Chicopee, Mass., assignor to Globe-Union Inc., Milwaukee, Wis., a corporation of Delaware
Filed Aug. 27, 1965, Ser. No. 483,231
9 Claims. (Cl. 320—39)

This is a continuation-in-part of my earlier filed application Serial No. 365,954, filed May 8, 1964, and now abandoned, and relates to battery charging systems and more particularly to battery charging systems which utilize a permanent magnet type alternator.

The usual method of controlling permanent magnet alternator-battery systems involves the use of a control element connected in series circuit between the alternator and the battery for adjusting current flow from the alternator to the battery. Various means have been employed, including relays operated in response to battery voltage to selectively open and close the battery circuit or to cut in and out generating windings by a step-type regulator. It has also been proposed to short circuit the output windings of the alternator, but this results in many problems of relay switch burn-out and arcing caused by the short circuited current flow through the switch. Thus when the switch is opened from its closed position substantial arcing occurs.

Thyratrons, silicon controlled rectifiers (SCR) and saturable reactors have also been used in series with the alternator output for controlling battery charging.

It is the principal object of this invention to provide a novel type of alternator-battery charging system having a simple and yet effective means of voltage control.

It is another object of this invention to provide a controlled, permanent magnet alternator-battery charging system which utilizes substantially the full alternator output for battery charging so that the voltage control is characterized by minimum parasitic current.

The above and other objects and advantages of this invention will be apparent from the following description and drawings in which:

FIG. 1 is a circuit diagram of an output control system for permanent magnet alternators;

FIGS. 2–4 show curves which illustrate the operating characteristics of the system shown in FIG. 1; and FIG. 5 is a circuit diagram showing a modified output control system embodying this invention.

Referring in detail to the drawings, in FIG. 1 is shown the combination of a permanent magnet alternator, control, and battery embodying this invention. Current is supplied by the permanent magnet alternator indicated generally at 3 which comprises a rotor 4 and output winding 5, connected by electrical leads 6 and 8 to a rectifier 10 which, as shown, is a full wave rectifier. The rectifier may consist of solid state components such as silicon or p-n junction diodes. The output of the rectifier is connected to the terminals of the battery 12 by means of electrical leads 14 and 16.

Means for controlling battery charging comprises a semi-conductor rectifier 18, which is shown in the drawing, and consists of a silicon controlled rectifier (SCR). The silicon controlled rectifier includes a cathode 20, an anode 22, and a gate 24. As is well known, the SCR consists of a disc of a number of alternate layers of N and P type silicon which give the SCR its unique characteristics. In typical SCR operation, the gate is biased well below what is known as the "break over" voltage and conduction of the SCR is triggered by providing current in the gate circuit. As the current in the gate circuit increases, the current through the anode-cathode junction increases rapidly. Only a moderate amount of trigger power is required to start the high conduction mode of operation. Once the gate has triggered the SCR into its low impedance state or "high conduction mode," the main current of the SCR can no longer be controlled by the gate. The SCR can be switched off by reducing the main current below the holding current level. To turn off the SCR in a minimum time, a reverse voltage is applied and the SCR is cut off reassuming its blocking or high impedance state.

As shown in FIG. 1, the anode 22 of the SCR is connected to junction 26 on the A.C. side of the rectifier 10. The cathode 20 is connected to junction 28 which is in turn connected by lead 16 to the battery 12 and junction 30 on the D.C. side of the rectifier 10. In the illustrated embodiment the lead 16 is shown as the ground lead, as represented at 31. The gate 24 of the SCR is connected to resistor 33 and thence to junction 32 between the collector 34 of the transistor 36 and collector load resistor 38. The transistor 36 also includes an emitter and base electrodes 40 and 42, respectively. The base 42 is electrically connected to a voltage divided network, comprising resistors 44 and 46 in series with ignition switch 47.

The emitter 40 of the transistor 36 is connected in series with a Zener diode 50, to the positive battery terminal, through the ignition switch 47.

The Zener diode 50 is in series with the collector-emitter junction of the transistor 36 and is poled to present high impedance to current flow through this junction of the transistor when the battery is being charged. The resistance of the voltage divider network may be on the order of 540 ohms so that there is only insignificant current flow through the ignition switch when the Zener is in the high impedance condition.

In operation with the ignition switch 47 closed, when the battery is charged to its rated voltage, for instance, 14 volts in a 12-volt system, the voltage developed across the voltage divider network is sufficient to cause breakdown of the Zener, permitting current flow in the base-emitter junction of the transistor. With the transistor 36 in its low impedance condition, the gate circuit of the SCR, connected to junction 32, also starts to conduct current. The SCR is effectively in parallel with the diode 11, disposed in the leg of rectifier 10 between junctions 26 and 30. Thus when the SCR is fully conductive, since its direction of conduction is opposite to that of the latter diode, it in effect short circuits this diode and provides a conductive path to the D.C. junction 30 and then to the A.C. lead 6 through the other diode 11 leading from the junction 30. It will thus be seen that the alternator winding is in effect short circuited during the half cycle which gives the lower end of the winding 5 a positive polarity.

It will be realized, since the SCR 18 is connected from the A.C. to the D.C. side of the circuit, the voltage seen across its anode and cathode is alternating as is the alternator output. As a result, the SCR is alternately cut "on" and "off," even when the battery voltage exceeds the predetermined value. It would thus appear that battery charging is reduced by only 50%. This is not the case, however, because of the severely unbalanced load on the alternator and the lagging power factor of its highly inductive windings 5. As a result, when the voltage polarity is such as to switch "off" the SCR, current changes in the alternator winding induce counter E.M.F. in the winding which oppose the flow of alternating current. As a consequence of these factors, it has been found that a very high percentage, approximately 85% of the normal alternator output, is diverted from the battery when the SCR is operating. Thus battery charging current is only a small percentage of the usual alternator output. Correlatively, the lagging power factor of the inductive windings results in low power expenditure when the SCR is conducting.

Since the SCR is turned "on" and "off" in response to the alternator output, a very accurate form of control occurs. It should be noted that when the battery is being charged, no substantial parasitic currents are required in the control portion of the system. The control components are only conductive when the battery voltage exceeds the set point voltage. In this way, the control does not detract from full utilization of the alternator output in charging the battery.

Operation of the output control embodying this invention is graphically illustrated in FIGS. 2-4 by oscillographs showing the voltages developed across the SCR 18 under various load conditions.

In FIG. 2 is shown a voltage curve 52 developed across the SCR when the battery voltage is below the predetermined value at which the SCR becomes conductive. The negative portion of the voltage curve 52 is caused by the voltage drop across the diodes of rectifier 10, the anode of the SCR being removed from ground potential by this value during the negative half cycle shown.

In FIG. 3, voltage curve 54 shows the voltages across the SCR during control, with the battery voltage varying above and below its rated value. As shown, the voltage curve increases in the positive direction until the battery voltage reaches the rated value, at which point, the SCR changes to its high conduction mode with a sharp drop in voltage represented by the dotted line 55. The SCR will remain in its conductive mode throughout the remainder of the positive alternator pulse represented by the dotted line showing at 52' in FIG. 3 and the SCR will be cut off again when the alternator output goes negative. Thus the shaded area in FIG. 3 represents the reduction in charging of the battery, resulting from positive going alternator pulses.

In FIG. 4 is shown an oscillograph of the voltage across the SCR when the voltage of battery 12 is so high that full conduction of the SCR occurs during the entire positive going output pulses of the alternator, and due to the unbalanced load this positive cycle exceeds one half of the full 360° cycle. In a severely unbalanced condition such as this, it has been found that only about 15% of the output of alternator 3 is effective in charging the battery 12.

Referring now to FIG. 5, there is shown a modified control system for permanent magnet alternators. While the system shown in FIG. 5 is based on the same concept as that disclosed in FIG. 1, it provides for somewhat more complete control and is effective for control of light resistive loads over a large ambient temperature range. As shown, in this embodiment two silicon controlled rectifiers, (SCR) 60 and 62 are used. The anodes 64 and 66 of the two SCR's are connected to opposite sides of an alternator output coil or winding 67. The cathodes 68 and 70 of each of the two SCR's are connected to ground illustrated by lead wire 71, which is in turn connected to a load, such as battery 73 and junction 74 connected to full wave rectifier 75, previously described in connection with FIG. 1. The gate electrodes 76 and 78 are each connected through current limiting resistors 79 to the collector electrode 80 of a semi-conductor 81, which as shown, is a NPN junction type transistor having collector 80, emitter 82 and base 84 electrodes.

The base 84 is connected to diode 86, which may be a silicon rectifier; this in turn is connected to the collector electrode 87 of a second transistor 88, which as shown may be a NPN junction type transistor. Resistors 89 and 99 are provided in series with the collector electrodes of the transistors 81 and 88 respectively and serve A.C. current limiting resistors.

The base of transistor 88 is connected to Zener diode 90, having a voltage breakdown point depending on the system in which the controller is used, and the emitter electrode of transistor 88 is connected to ground wire 71.

A resistor 91 interconnects the base of transistor 88 to ground line 71 and serves as a base-emitter biasing resistor.

A voltage divider network is provided for controlling operation of the Zener diode 90 and for temperature compensation. The network comprises resistors 94, 96 and 98 connected in series across the battery load 73. Variable resistor or potentiometer 96 is adjustable to bias Zener diode 90 to its breakdown point when battery 73 is charged to its rated voltage. Resistor 94 is a temperature compensating resistor selected to provide a high degree of system accuracy over ambient temperatures ranging from −25° F. to +145° F.

Resistors 100 and 102 are connected across resistors 98 and 96 and serve as calibration and trimming resistors for the voltage divider and potentiometer.

A capacitor 104 is connected across temperature compensating resistor 94 and together therewith forms a resistance-capacitance filter network which minimizes voltage ripple developed by the alternator across the load or battery 73.

In general the circuit shown in FIG. 5 operates the same as the FIG. 1 embodiment. In operation, while the battery is being charged up to its rated capacity, the Zener diode 90 is non-conducting and the lack of current in base-emitter junction of transistor 88 holds the transistor in its high impedance mode. During this phase there is current flow through resistor 99, diode 86 and the base-emitter electrodes of transistor 81 to ground 71. The current flow in the base-emitter junction switches transistor 81 to its conductive mode. The transistor 81 remains in its conductive mode while transistor 88 remains non-conductive until the battery 73 reaches its rated voltage. When the rated voltage is attained, the voltage drop across the voltage divider network increases sufficiently to cause Zener diode 90 to break down with a resulting current flow through the base emitter electrodes of transistor 88 causing the latter to be switched to its low impedance mode. When this happens the transistor 88 shunts current from diode 86 and the base-emitter junction of transistor 81 which is thereby cut "off." Current is then diverted through resistors 89 and 79 to the gates 76 and 78 of the SCR's 60 and 62. The SCR are thereby switched to conductive mode connecting both ends of the alternator winding 67 directly to ground, thus the total output of the alternator both positive and negative pulses are shunted from the battery until its voltage drops below its rated value and Zener diode 90 again becomes non-conductive resulting in transistor 88 being switched "off" and transistor 81 "on."

When transistor 81 is switched "on" current from the alternator flows through the collector-emitter electrodes of transistor 81, shunts the current in the gate circuits to ground and imposes a cut-off potential on the SCR's 60 and 62 whereby they are turned "off," thus completing one cycle of operation of the control system.

The use of two SCR's to shunt positive and negative alternator pulses as described in connection with FIG. 5 results in substantially all ouput from the alternator being diverted from the load as compared with the approximately 85% achieved in the FIG. 1 embodiment.

While this invention and its embodiments have been illustrated with a single phase alternator, it may of course also be used in three phase systems. This may be accomplished by connecting the anode of the SCR to the neutral point of the three phase windings. More than one SCR may also be used, one to control each phase of the alternator.

Having thus described this invention, what is claimed is:

1. Battery charging system comprising a permanent magnet alternator having a rotor and output winding, a bridge rectifier connected to the alternator output and changing the output to direct current, the battery of said system being connected to the direct current legs of said bridge rectifier, a voltage divider connected across said battery terminals, and in combination a Zener diode and transistor circuit conductive in response to a predetermined voltage developed across said voltage divider, and a silicon controlled rectifier having cathode and anode electrodes connected in circuit from an alternating current leg of said bridge rectifier to one of the direct current legs of said rectifier, said silicon controlled rectifier being normally in its non-conductive mode, and having a gate electrode electrically in circuit with the Zener diode and transistor circuit whereby conduction of the latter circuit triggers break down of the silicon controlled rectifier causing a direct grounding of the output of the alternator whenever the battery voltage exceeds the predetermined value.

2. Battery charging system as set forth in claim 1 in which said transistor includes base, emitter and collector electrodes, said Zener diode being in series with the collector-emitter junction of the transistor and the base thereof being connected to the voltage divider network.

3. Output control for permanent magnet alternators having a rotor and at least one output winding comprising a rectifier connected to convert the alternator output to direct current for a load, and a solid state controller including at least two silicon controlled rectifiers each having anode and cathode electrodes connected in series from the alternating current sides of said rectifier to the direct current side of said rectifier, said silicon controlled rectifiers having gate electrodes, and means connected to said gate electrodes for selectively switching said silicon controlled rectifiers from high to low impedance mode in response to voltage drop across said load.

4. Output control for permanent magnet alternators as set forth in claim 3 in which said means for selectively switching said silicon controlled rectifiers includes a Zener diode and at least one junction type transistor having base, collector and emitter electrodes with its base-emitter electrodes in series with said Zener diode.

5. Control for permanent magnet alternator having at least one output winding comprising a bridge rectifier with alternating current and direct current sides, the alternating current side of the rectifier connected to said output winding, at least two silicon controlled rectifiers having anode, cathode and gate electrodes, circuit means connecting each of said anode and cathode of the silicon controlled rectifiers from the alternating current to the direct current side of said rectifier, means conductive in response to voltage across a load on the direct current side of said rectifier and including a Zener diode and at least two junction type transistors interconnected for flip-flop operation, means for selectively diverting and shunting current to and away from said gate electrodes in response to flip-flop operation of said transistors.

6. A battery charging system comprising a permanent magnet alternator, a rectifier connected in circuit with the output of the alternator and with said battery, sensing and control means conductive in response to a predetermined voltage developed by said battery and a silicon controlled rectifier having cathode, anode and gate electrodes, a first circuit connecting the cathode-anode electrodes of said silicon rectifier from one alternating current side of the rectifier to a direct current side of said rectifier, a second circuit interconnecting the gate electrode to said sensing and control means, said first circuit having an impedance not substantially greater than that of the silicon rectifier.

7. Output control for permanent magnet alternators comprising a rectifier connected to receive the output of said alternator, a battery, circuit means connecting the battery terminals to the direct current high and low potential sides of said rectifier, control means conductive in response to a predetermined battery voltage, a silicon controlled rectifier having a gate electrode in circuit with said control means, and cathode-anode electrodes connected in another circuit from only one alternating current side of the rectifier to one direct current side of the rectifier, said silicon controlled rectifier being responsive to said control means to effect only half wave control of the alternator whenever the battery voltage exceeds a predetermined value.

8. Output control as set forth in claim 7 in which said control means includes a Zener diode and in which the said circuit containing the cathode-anode electrodes of the silicon rectifier is absent substantial additional impedance imparted by any other active or passive circuit element whereby a severely unbalanced load on said alternator is obtained when the cathode-anode electrodes of said silicon controlled rectifier are conductive.

9. Output control as set forth in claim 8 in which said control circuit further includes a voltage divider, connected across the battery terminals and a transistor circuit conductive in response to a predetermined voltage across said voltage divider.

References Cited

UNITED STATES PATENTS

| | | | |
|---|---|---|---|
| 3,018,432 | 1/1962 | Palmer | 323—66 |
| 3,116,439 | 12/1963 | Riebs | 317—22 |
| 3,141,124 | 7/1964 | Atherton | 320—1 |
| 3,217,229 | 11/1965 | Ballard | 320—68 |
| 3,237,078 | 2/1966 | Mallory | 320—17 |
| 3,260,917 | 7/1966 | Shimwell et al. | 321—18 |
| 3,270,268 | 8/1966 | Carmichael et al. | 320—61 |

FOREIGN PATENTS 759,885 10/1956 Great Britain.

JOHN F. COUCH, *Primary Examiner.*

S. WEINBERG, *Assistant Examiner.*